No. 760,996. PATENTED MAY 24, 1904.
V. P. KELLER.
EXCAVATOR.
APPLICATION FILED SEPT. 4, 1903.
NO MODEL.

Witnesses:-

Inventor:-
Volney P. Keller,
by his Attorneys;

No. 760,996. Patented May 24, 1904.

UNITED STATES PATENT OFFICE.

VOLNEY P. KELLER, OF CAPON IRON WORKS, WEST VIRGINIA, ASSIGNOR OF ONE-HALF TO JOHN J. DUNNE, OF PHILADELPHIA, PENNSYLVANIA.

EXCAVATOR.

SPECIFICATION forming part of Letters Patent No. 760,996, dated May 24, 1904.

Application filed September 4, 1903. Serial No. 171,968. (No model.)

*To all whom it may concern:*

Be it known that I, VOLNEY P. KELLER, a citizen of the United States, residing at Capon Iron Works, Hardy county, West Virginia, have invented certain Improvements in Excavators, of which the following is a specification.

My invention relates to certain improvements in that class of excavators which are intended for acting upon submerged ground, and especially to excavators of that type which employ rotary or other cutters for breaking away or loosening the earth, the object of my invention being to provide for the uniform and effective action of the cutters and the effective distribution or disposal of the excavated material. These objects I attain in the manner hereinafter set forth, reference being had to the accompany drawings, in which—

Figure 1:
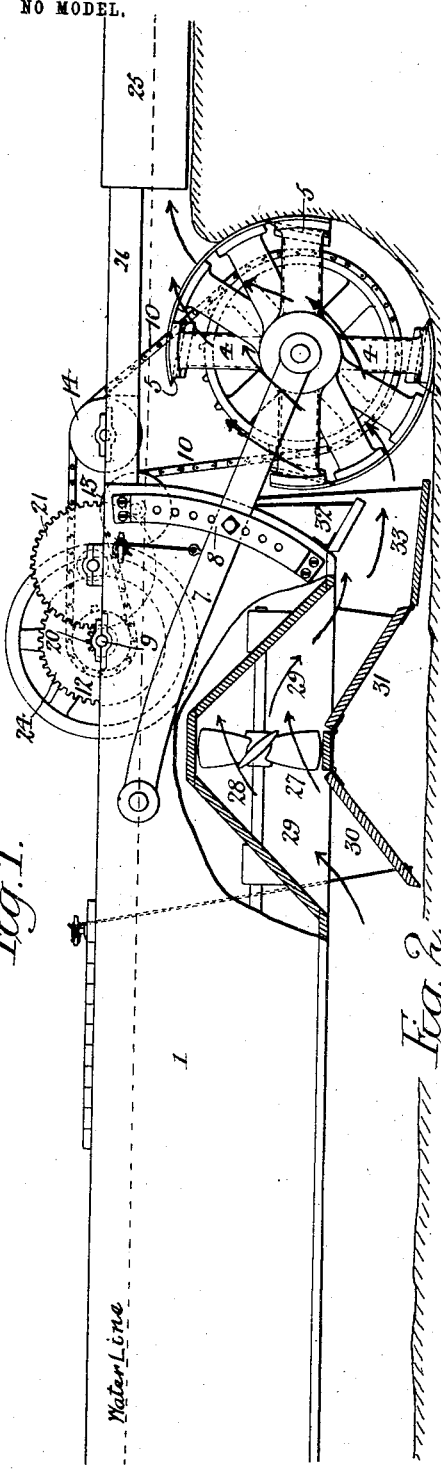
Figure 2:
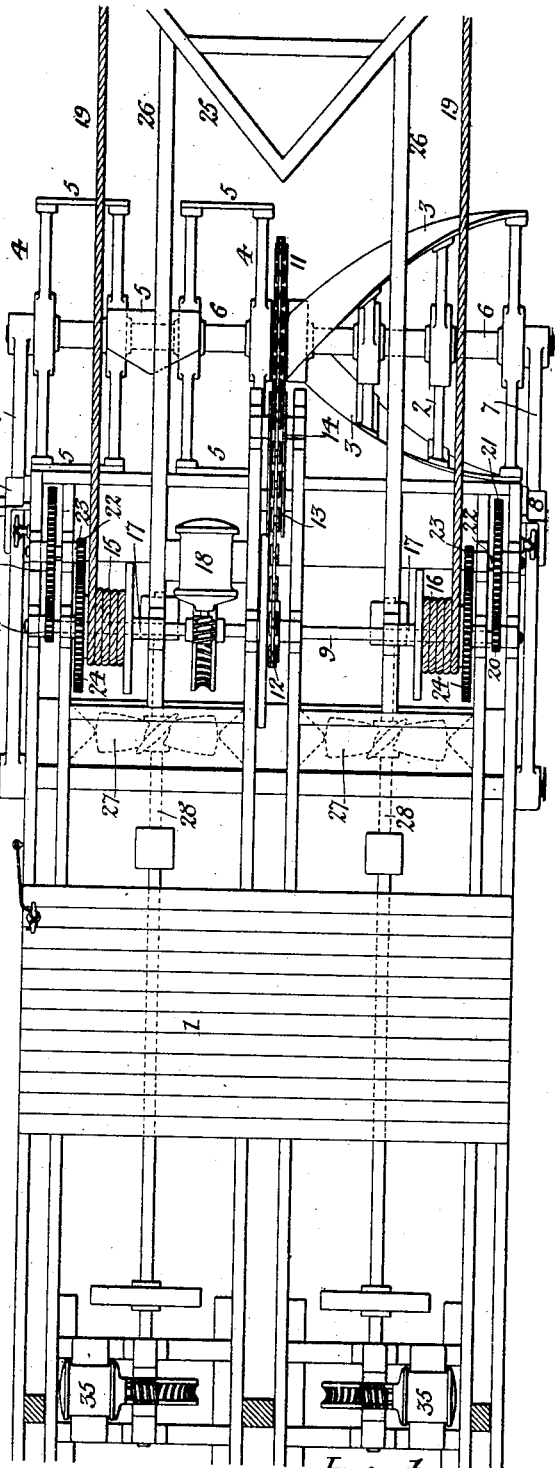

Figure 1 represents, partly in side elevation and partly in section, sufficient of a dredging-machine or excavator to illustrate those parts of the same to which my improvements especially relate; and Fig. 2 is a plan view of the same.

1 represents the bow portion of a barge or scow, upon which the excavating device is mounted, said excavating device in the present instance consisting of a rotary cutter or cutters which may be of different types, two different forms of cutter being shown in the drawings, one of these consisting of a rotating frame 2, carrying a series of spirally-arranged blades or cutters 3, and the other consisting of a frame 4, carrying short straight blades or cutters 5, the blades 3 extending throughout the entire width of the cutter, but each of the blades 5 being of lesser width, the blades, however, being alternated, so that they produce a cut of the full width of the frame carrying the said blades. Both cutters are mounted upon a transverse shaft 6, which has its bearings in the forward ends of arms 7, pivoted to the sides of the scow and suitably guided by segmental bars 8 thereon, these bars being by preference perforated for the reception of bolts for engagement with the arms 7, so as to provide for the support of the latter in different positions of adjustment, whereby the cutters can be raised or lowered at the front of the scow and the depth of cut due to the action of the cutters thereby properly regulated.

The shaft 6 is rotated in any suitable manner from a shaft 9 on the scow, such rotation being effected in the present instance by means of a chain belt 10, passing around a chain-wheel 11, securely mounted on the shaft 6, and also around a chain-wheel 12 on the shaft 9 and around suitable interposed carrier-rolls 13 and 14, properly mounted upon the deck-framing of the scow.

The shaft 9 is rotated by any available form of motor 18, mounted on the scow, and in addition to operating the cutter-shaft it also operates a pair of winding capstans or windlasses 15 and 16, upon which are wound ropes or chains 19, leading to an anchorage at any suitable distance in front of the scow, whereby as these windlasses are rotated the ropes or chains will be wound up thereon and the scow will be drawn forwardly, so as to feed the rotary cutters into the bank ahead of the scow, and thereby cause the proper cutting away or excavating of said bank.

The forward feeding movement of the scow may be either continuous or intermittent, depending upon the character of the soil which is being acted upon.

In the present instance a slow and continuous forward movement is provided for by driving the windlasses 15 and 16 from the shaft 9, but at a much slower rate of speed, these windlasses being carried by the tubular shafts 17, surrounding the shaft 9, which is adapted to suitable bearings on the deck of the scow, the desired slow rotation of these tubular shafts by the shaft 9 being effected through the medium of interposed gearing of any appropriate character, that shown in the drawings comprising a pinion 20 on the shaft 9, which meshes with a spur-wheel 21 on a short counter-shaft 22, the latter carrying a pinion 23, which meshes with a spur-wheel 24 on the windlass-shaft.

The machine is intended to operate upon submerged ground and to cut therein a canal or passage-way equal to the width of the cutter or cutters employed, and in order to dispose of the excavated material I provide a forcible current of water projected in front of the scow and onto and through the cutter or cutters, whereby the excavated material as it is cut away from the bank in advance is caught up and carried forwardly by this advancing current, so as to be distributed upon the surface of the bank in advance of the cutting or canal which is being formed therein. As the current advances it also spreads laterally, and hence has a tendency to carry a great portion of the excavated material to one side or the other of the canal which is being formed; but in order to better insure such lateral spreading of the current, and consequent conveying of the excavated material to the sides of the canal I prefer to mount in advance of the scow a spreader or deflector 25, this deflector being in the present instance mounted upon beams 26, extending forwardly from the scow and being of such depth as to approach closely to the surface of the ground in advance of the canal, the purpose being to prevent as far as possible deposit of excavated material directly in advance of the scow and its cutters.

In order to produce the forwardly-projected current to which I have alluded, I employ one or more pumps or other water-forcing devices upon the scow, preference being given to a pump of the rotary form operating in a suitable channel or passage-way formed in the scow, this channel or passage-way receiving its supply of water at the after end and discharging it at the forward end, and in connection with such channel or passage-way I use certain shutters or deflectors whereby the direction of the escaping or emerging current can in a measure be controlled.

In the present instance two pumping devices are employed, each consisting of a series of inclined blades or vanes 27, mounted upon a longitudinal shaft 28, which is free to turn in suitable bearings in the hull of the scow and is rotated by a motor 35 of any appropriate character. Each of these rotary pumps is contained in a channel or passage-way 29, formed in the lower portion of the hull of the scow, the bottom openings or mouths of this passage-way being controlled by shutters or valves, that of the inlet-mouth being shown at 30 and that of the outlet-mouth being shown at 31. These shutters can be properly controlled by means of lines leading to the deck of the scow, and the area of both inlet and outlet of the passage 29 can thereby be readily governed.

In order to control the direction and force of the escaping current, I also employ other shutters 32 and 33, likewise controlled by suitable lines from the deck of the scow, the shutter 32 being hinged to the bow portion of the scow and the shutter 33 being similarly hinged to the front end of the shutter 31.

By raising or lowering the shutter 32 in respect to the shutter 33, therefore, the area of the outlet from the passage 29 is regulated, or the same result may be attained by raising or lowering the shutter 33 in respect to the shutter 32, and by raising or lowering both shutters simultaneously the direction of the escaping current can be governed, and said current can be discharged either at a point close to the bottom of the canal which is being cut, as shown in Fig. 1, or at any desired point above the bottom of said canal.

When the excavator is not at work, all of the shutters may be raised, the cutters being also raised so as not to increase the draft of the scow or interfere with the navigation of the same in shoal water.

Having thus described my invention, I claim and desire to secure by Letters Patent—

1. The combination, in an excavator, of a cutter, a scow or other support therefor, and means for causing a forward current of water whereby the excavated material is carried forwardly beyond the cutter, substantially as specified.

2. The combination, in an excavator, of a cutter, a scow or other support therefor, means for causing a forwardly-flowing current whereby the excavated matter is carried in advance of the cutter, and means for laterally deflecting said current in advance of the scow, substantially as specified.

3. The combination, in an excavator, of a cutter, a scow or other support therefor, means for causing a forwardly-flowing current whereby the excavated matter is carried in advance of the cutter, and a deflector mounted upon beams projecting forwardly from the bow of the scow, substantially as specified.

4. The combination in an excavator, of a rotary cutter, a driving-shaft therefor, a windlass having a tubular shaft mounted on said driving-shaft, and speed-reducing gearing interposed between said driving-shaft and the windlass-shaft, substantially as specified.

5. The combination, in an excavator, of a rotary cutter, a scow or other support therefor, a driving-shaft mounted in fixed bearings on said scow, means for raising and lowering the cutter in advance of the scow, and a driving device for the cutter comprising a chain-wheel on the cutter-shaft, a chain-wheel on the driving-shaft, and a pair of intermediate supporting-wheels, one for each run of said chain, substantially as specified.

6. The combination, in an excavator, of a cutter, a scow or other support therefor, and means for producing a forwardly-projected current past the cutter, said means comprising a rotary pump contained in a channel or passage-way of the scow, substantially as specified.

7. The combination, in an excavator, of a cutter, a scow or other support therefor, a rotary pump contained in a channel or passage-way of the scow, and serving to produce a forwardly-directed current of water, and a shutter for closing or partially closing the exit-mouth of said channel or passage-way, substantially as specified.

8. The combination, in an excavator, of a cutter, a scow or other support therefor, a rotary pump contained in a channel or passage-way of the scow and serving to produce a forwardly-directed current of water, and shutters for closing or partially closing both the inlet and exit mouths of said channel or passage-way, substantially as specified.

9. The combination, in an excavator, of a cutter, a scow or other support therefor, a pump for producing a forwardly-directed current of water past the cutter, and an adjustable shutter for governing the direction of said current, substantially as specified.

10. The combination, in an excavator, of a cutter, a scow or other support therefor, a pump for directing a current of water forwardly past said cutter, and upper and lower adjustable shutters for governing the direction of said current, substantially as specified.

11. The combination, in an excavator, of a cutter, a scow or other support therefor, a pump for directing a current of water forwardly past said cutter, and upper and lower independently-adjustable shutters for governing the direction of said current and regulating area of the same, substantially as specified.

In testimony whereof I have signed my name to this specification in the presence of two subscribing witnesses.

VOLNEY P. KELLER.

Witnesses:
F. E. BECHTOLD,
JOS. H. KLEIN.